United States Patent Office 3,703,487
Patented Nov. 21, 1972

3,703,487
INTUMESCENT COATING COMPOSITION
Joseph Green, East Brunswick, and Shirley H. Roth, Highland Park, N.J., and John J. Seipel, Amber, Pa., assignors to Cities Service Company, New York, N.Y.
No Drawing. Filed Nov. 5, 1971, Ser. No. 196,230
Int. Cl. C08j 1/20
U.S. Cl. 260—2.5 FP
9 Claims

ABSTRACT OF THE DISCLOSURE

A binder showing thermal change at a suitable temperature is used to dissolve or disperse a bis(aromatic sulfonamide) intumescent agent wherein the aromatic rings are linked by a divalent functional group, such as oxy, thio, sulfinyl, sulfonyl, imino, ureido, thioureido, guanido, carbonate, phosphate, or alkylene group. Among the preferred binders are suitable vinyl chloride-vinylidene chloride copolymers and chlorinated and chlorosulfonated polyethylenes. The preferred intumescent agents are those in which two benzenesulfonamide groups are linked by an oxy, ureido, sulfonyl, or imino group.

BACKGROUND OF THE INVENTION

Field of the invention

This invention relates to intumescent coating compositions and more particularly relates to such compositions comprising a bis(aromatic sulfonamide) and a binder therefor.

Description of the prior art

As disclosed in copending application S.N. 196,229, filed Nov. 5, 1971, in the name of Shirley H. Roth, a substrate may advantageously be protected from heat and fire by the application thereto of an intumescent composition comprising a novel one-component intumescent agent. This intumescent agent is a bis(aromatic sulfonamide) wherein the aromatic rings are linked by a divalent functional group, such as an oxy, thio, sulfinyl, sulfonyl, imino, ureido, thioureido, guanido, carbonate, phosphate, or alkylene group. Although these intumescent agents may be applied to the substrate to be protected without the use of a binder, the use of a binder is preferred. However, it has been found that many binders useful in intumescent compositions of the prior art are unsatisfactory for use with the new intumescent agents.

SUMMARY OF THE INVENTION

An object of this invention is to provide intumescent coating compositions comprising a bis(aromatic sulfonamide) and a binder.

Another object is to provide such compositions wherein the binder permits intumescence of the bis(aromatic sulfonamide) to a stable foam char.

These and other objects are attained by dispersing or dissolving an intumescent agent corresponding to the formula:

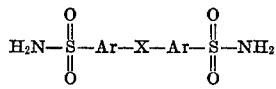

wherein Ar is a divalent aromatic residue and X is a divalent functional group in a binder showing thermal change, such as decomposition, beginning between about 60° C. below the temperature at which the neat intumescent agent begins to decompose and intumesce and about 60° C. below the temperature at which the neat intumescent agent ceases intumescing, all temperatures being those determined by differential scanning calorimetry (DSC) in a nitrogen atomsphere at a scanning rate of 10° C./min.

DESCRIPTION OF THE PREFERRED EMBODIMENTS

The compounds used as intumescent agents in accordance with the invention may be any compounds corresponding to the above formula. Thus, Ar may be a divalent radical derived from an aromatic hydrocarbon or a substituted aromatic hydrocarbon bearing up to three substituents, such as sulfonamido, chloro, bromo, nitro, etc.; and X may be any divalent functional group, e.g., an oxy, thio, sulfinyl, sulfonyl, imino, ureido, thioureido, guanido, carbonate, phosphate, or alkylene group. Substituents on the aromatic rings are sometimes advantageous, e.g., to impart flame retardance or other desirable property; but, except for sulfonamido groups, they usually decrease the degree to which the compounds intumesce. Therefore, when the degree of intumescence is of paramount importance, the preferred compounds are those wherein Ar is a divalent aromatic hydrocarbon residue, e.g., a residue derived from benzene or naphthalene, or a divalent sulfonamide-substituted derivative thereof. The sulfonamide groups may be ortho, meta, or para to the divalent functional group, preferably ortho or para.

Exemplary of the intumescent agents which may be used in the practice of the invention are p,p'-oxybis(benzenesulfonamide),
p,p'-oxybis(2,5-dibromobenzenesulfonamide),
p,p'-oxybis(2-chlorobenzenesulfonamide),
p,p'-oxybis(2-nitrobenzenesulfonamide),
p,p'-oxybis(2-sulfonamidobenzenesulfonamide),
p,p'-methylenebis(benzenesulfonamide),
p,p'-ethylenebis(benzenesulfonamide),
p,p'-propylenebis(benzenesulfonamide),
p,p'-butylenebis(benzenesulfonamide),
p,p'-thiobis(benzenesulfonamide,
p,p'-sulfinylbis(benzenesulfonamide),
p,p'-sulfonylbis(benzenesulfonamide),
p,p'-iminobis(benzenesulfonamide),
p,p'-ureidobis(benzenesulfonamide),
p,p'-thioureidobis(benzenesulfonamide),
p,p'-guanidobis(benzenesulfonamide),
p,p'-carbonatobis(benzenesulfonamide),
p,p'-phosphatobis(benzenesulfonamide), the corresponding o,o'- and m,m'-bis(benzenesulfonamide), and the corresponding bis(naphthalenesulfonamides). The preferred intumescent agents are p,p'- and o,o'-oxy-, p,p'- and o,o'-ureido-, m,m'-sulfonyl, and p,p'- and o,o'-iminobis(benzenesulfonamides).

When these intumescent agents are heated, they decompose and intumesce, generally at temperatures in the range of about 250–450° C., as determined by DSC in a nitrogen atmosphere at a scanning rate of 10° C./min. The particular temperatures at which a particular neat intumescent agent begins to decompose and intumesce and ceases intumescing are easily determined by routine experimentation. For example, determined as indicated above, neat p,p'-oxybis(benzenesulfonamide) begins to decompose and intumesce at about 275° C. and ceases intumescing at about 400° C. The temperatures may also be determined by other techniques, such as differential thermal analysis.

The binder employed in the practice of the invention may be any resin showing thermal change beginning between about 60° C. below the temperature at which the neat intumescent agent begins to decompose and intumesce and about 60° C. below the temperature at which the neat intumescent agent completes intumescing. Binders showing thermal change below or above this temperature range generally do not permit the bis(aromatic sulfonamide) to intumesce to a stable foam char. It is particularly unexpected that the time of thermal change of the binder should be the criterion of its operability, since the prior art would indicate that only its chemical composition would be determinative of its usefulness. In the present invention, the binder's chemical composition, per se, is not a criterion of its operability. Thus, a variety of types of binders may be used, alone or in combination.

Exemplary of utilizable types of binders are cellulose ethers, such as methyl cellulose, ethyl cellulose, etc.; polyurethanes; melamine- and urea-formaldehyde resins; polysulfide resins; epoxy resins; chlorinated and chlorosulfonated polymers of alkenes containing 2–4 carbon atoms (i.e., ethylene, propylene, and butylene), such as chlorinated polyethylene, chlorosulfonated polyethylene, etc.; vinylidene polymers, such as homopolymers and interpolymers of vinyl halides (e.g., vinyl chloride, etc.), vinyl esters (e.g., vinyl acetate, etc.), vinylidene halides (e.g., vinylidene chloride, etc.), monovinylidene aromatic monomers (e.g., styrene, etc.), conjugated dienes containing 4–6 carbon atoms (e.g., butadiene-1,3, isoprene, chloroprene, piperylene, dimethylbutadiene-1,3, etc.), acrylonitrile, methacrylonitrile, alkyl(meth)acrylates wherein the alkyl group contains 1–20 carbon atoms (e.g., methyl acrylate, 2-ethylhexyl acrylate, the corresponding methacrylates, etc.), etc. Particularly preferred binders are vinyl chloride-vinylidene chloride copolymers and chlorinated and chlorosulfonated polyethylenes. It is understood, of course, that utilizable resins of these types must show thermal change at a suitable temperature.

The compositions of the invention are prepared by dissolving or dispersing the intumescent agent in the binder in a weight ratio of about 0.075–14/1. When desired, the composition may also contain up to about 70% by weight, based on the total composition, of one or more of the other ingredients conventionally used in intumescent compositions, e.g., stabilizers, dispersing agents, pigments, driers, biocides, anti-foamers, thickeners, protective colloids, fillers, blowing agents, etc.

The composition may be applied to the substrate to be protected, e.g., a wood, metal, or plastic substrate, in any suitable manner, such as by fluidized bed coating, spraying, electrodeposition, etc. However, it is preferably applied in the form of a paint having a solids content of about 10–70% by weight and comprising a dispersion in a suitable liquid medium, e.g., water or a solvent or solvent mixture. Regardless of the method used to apply the intumescent coating, it is preferably applied so as to deposit a coating having a dry thickness of about 0.001–0.75 inch.

The use of the binders of the invention allows the bis-(aromatic sulfonamides) to intumesce to stable foam chars having good volume and cell structure. The coating compositions, when tested in accordance with the two-foot tunnel test mentioned below, have desirable flame spreading ratings, e.g., lower than 50, frequently lower than 25, and good insulative values.

The following examples are given to illustrate the invention and are not intended as a limitation thereof. Unless otherwise specified, parts mentioned are parts by weight.

Example I.—Ball mill a mixture of 84 parts of p,p'-oxybis(benzenesulfonamide), 27 parts of a vinyl chloride-vinylidene chloride copolymer having a decomposition temperature of about 260° C., 6 parts of titanium dioxide, 105 parts of methyl ethyl ketone, and 3 parts of suspending agent to form a coating composition. Apply the composition to four poplar test panels to form films having a dry thickness of 0.024 inch. Test the panels in accordance with the two-foot tunnel test described in H. L. Vandersall, "The Use of a Small Flame Tunnel for Evaluating Fire Hazard," Journal of Paint Technology, vol. 39, No. 511, pp. 494–500 (1967). The panels have an average flame spread rating of 10, an average degree of intumescence of 19 mm., and an average insulative value of 90° C.

Example II.—Repeat Example I except for preparing the coating composition from 100 parts of p,p'-oxybis-(benzenesulfonamide), 32 parts of a chlorinated polyethylene having a decomposition temperature of about 300° C., 7.5 parts of titanium dioxide, and 125 parts of xylol and forming films having a dry thickness of about 0.013 inch. The panels have an average flame spread rating of 21, an average degree of intumescence of 12 mm., and an average insulative value of 111° C.

Example III.—Repeat Example I except for preparing the coating composition from 100 parts of p,p'-oxybis-(benzenesulfonamide), 32 parts of a chlorosulfonated polyethylene having a decomposition temperature of about 250° C., 7.5 parts of titanium dioxide, and 125 parts of methyl isobutyl ketone and forming films having a dry thickness of about 0.018 inch. The panels have an average flame spread rating of 15, an average degree of intumescence of 11 mm., and an average insulative value of 109° C.

As demonstrated above, intumescent coating compositions having flame spread ratings less than 50 and good insulative values are obtained when a bis(aromatic sulfonamide) is compounded with a binder having a thermal activity point in the range of about 235–260° C. Similar results are observed when:

(1) The bis(aromatic sulfonamide) is o,o'-oxy-, p,p'- or o,o'-ureido-, m,m'-sulfonyl, or p,p'- or o,o'-iminobis-(benzenesulfonamide) and (2) The binder having a suitable thermal activity point is an oil modified polyurethane, ethyl cellulose, a 50/50 mixture of a polysulfide and an epoxy resin, a vinylidene chloride-acrylonitrile copolymer, a butadiene-acrylonitrile copolymer, or a polychloroprene.

Example IV—Control.—Repeat Example I except for preparing the coating composition from 100 parts of p,p'-oxybis(benzenesulfonamide), 32 parts of a styrene-acrylate copolymer having a glass transition temperature of about 72° C. and a decomposition temperature of about 375° C., 7.5 parts of titanium dioxide, and 125 parts of xylol and forming films having a dry thickness of about 0.018 inch. The panels have an average flame spread rating of 103, no intumescence, and an average insulative value of 158° C.

It is obvious that many variations may be made in the products and processes set forth above without departing from the spirit and scope of this invention.

What is claimed is:

1. An intumescent coating composition comprising (A) an intumescent agent corresponding to the formula:

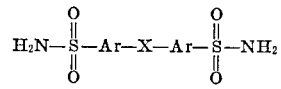

wherein Ar is a divalent aromatic residue and X is a divalent functional group and (B) a resin binder showing thermal change beginning between about 60° C. below the temperature at which the neat intumescent agent begins to decompose and intumesce and about 60° C. below the temperature at which the neat intumescent agent ceases intumescing.

2. The composition of claim 1 wherein the intumescent agent/binder weight ratio is about 0.075–14/1.

3. The composition of claim 1 wherein the binder is a cellulose ether, a polyurethane, a polysulfide resin, an epoxy resin, a melamine- or ureaformaldehyde resin, a vinylidene polymer and/or a chlorinated or chlorosulfonated polymer of an alkene containing 2–4 carbon atoms.

4. The composition of claim 1 wherein Ar is a divalent aromatic hydrocarbon residue derived from benzene or naphthalene, or a divalent sulfonamide-substituted derivative thereof, and X is a divalent functional group selected from oxy, thio, sulfinyl, sulfonyl, imino, ureido, thioureido, guanido, carbonate, phosphate, and alkylene groups.

5. The composition of claim 4 wherein the intumescent agent is p,p'- or o,o'-oxybis(benzenesulfonamide), p,p'- or o,o'- ureidobis(benzenesulfonamide), m,m' - sulfonylbis-(benzenesulfonamide), or p,p'- or o,o'-iminobis(benzenesulfonamide).

6. The composition of claim 5 wherein the binder has a decomposition temperature in the range of about 215–340° C. and is a cellulose ether, a polyurethane, a polysulfide resin, an epoxy resin, a melamine- or urea-formaldehyde resin, a vinylidene polymer and/or a chlorinated or chlorosulfonated polymer of an alkene containing 2–4 carbon atoms.

7. The composition of claim 6 wherein the binder is a vinyl chloride-vinylidene chloride copolymer.

8. The composition of claim 6 wherein the binder is a chlorinated polyethylene.

9. The composition of claim 6 wherein the binder is a chlorosulfonated polyethylene.

References Cited

UNITED STATES PATENTS 2,616,866    11/1952    Juda _____ 260—2.5 FP
3,296,340    1/1967    Eichhorn _____ 260—2.5 FP MURRAY TILLMAN, Primary Examiner M. FOELAK, Assistant Examiner U.S. Cl. X.R.

106—122, 186; 117—132 C, 132 B, 132 BE, 132 BF, 138.8 A, 148, 161 KP, 161 LN, 161 UZ, 161 UN, 161 UF, 161 ZB, 161 H; 260—2.5 R, 2.5 AJ, DIG. 24